United States Patent [19]

Riutta

[11] Patent Number: 4,606,216
[45] Date of Patent: Aug. 19, 1986

[54] VEHICLE CLAMPING AND SUPPORT APPARATUS

[75] Inventor: Raine R. Riutta, Vancouver, Canada

[73] Assignee: American Wedge Clamp Ltd., British Columbia, Canada

[21] Appl. No.: 790,550

[22] Filed: Oct. 23, 1985

Related U.S. Application Data

[63] Continuation-in-part of Ser. No. 543,798, Oct. 21, 1983, abandoned, which is a continuation-in-part of Ser. No. 367,197, Apr. 12, 1982, abandoned.

[30] Foreign Application Priority Data

Sep. 18, 1981 [CA] Canada ................................. 386200
Mar. 10, 1982 [CA] Canada ................................. 398046

[51] Int. Cl.$^4$ ............................................. B21D 1/14
[52] U.S. Cl. ....................................... 72/422; 72/705;
248/229; 403/400
[58] Field of Search .................. 72/422, 705; 248/229;
403/346, 396, 400, 409; 24/335

[56] References Cited

U.S. PATENT DOCUMENTS

| 2,705,040 | 3/1955 | Howick . |
| 3,091,278 | 5/1963 | Padgett . |
| 3,108,629 | 10/1963 | Jenkins . |
| 3,338,186 | 8/1967 | Herian . |
| 3,590,623 | 7/1971 | Hunnicutt et al. . |
| 3,861,816 | 1/1975 | Zaidan ................................. 403/400 |
| 3,869,767 | 3/1975 | Hunnicutt et al. . |
| 3,921,433 | 11/1975 | Whitney . |
| 4,238,951 | 12/1980 | Grainger et al. . |
| 4,289,016 | 9/1981 | Hare . |

FOREIGN PATENT DOCUMENTS

| 2606806 | 8/1977 | Fed. Rep. of Germany . |
| 2718241 | 11/1978 | Fed. Rep. of Germany . |
| 2745807 | 4/1979 | Fed. Rep. of Germany . |
| 2834277 | 2/1980 | Fed. Rep. of Germany . |
| 1472430 | 3/1967 | France ................................. 403/346 |

Primary Examiner—Lowell A. Larson
Attorney, Agent, or Firm—Townsend and Townsend

[57] ABSTRACT

A clamping device comprises a clamping means disposed towards an upper end of the device for clamping to a vehicle body and a securing means disposed towards a lower end of the device for releasably securing first and second transverse support members. The device is clamped to a vehicle body and supports the vehicle body in a fixed position above the transverse support members.

Vehicle clamping and support apparatus includes four such clamping devices. One pair of clamping devices is clamped to opposite, rear undersides of the vehicle body. The other pair of clamping devices is clamped to opposite, front undersides of the vehicle body. First and second support members are then slideably positioned along the lateral undersides of the vehicle by slideably engaging the support members with the clamping devices clamped along each side of the vehicle. Third and fourth support members slideably engage the front and rear clamping device pairs, respectively, transversely to the first and second support members. The support members are secured to the clamping devices to provide a rigid framework for supporting the vehicle which facilitates collision repair work on the vehicle.

29 Claims, 7 Drawing Figures

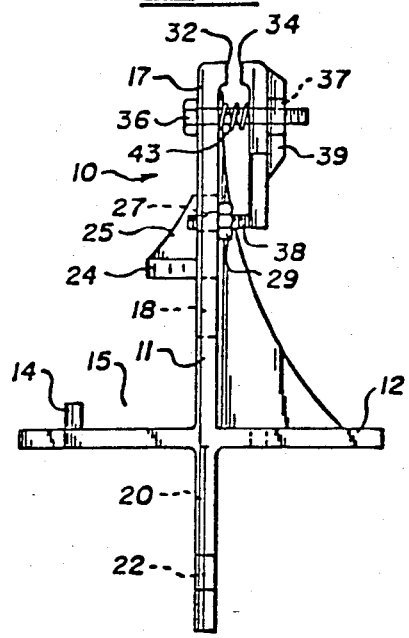
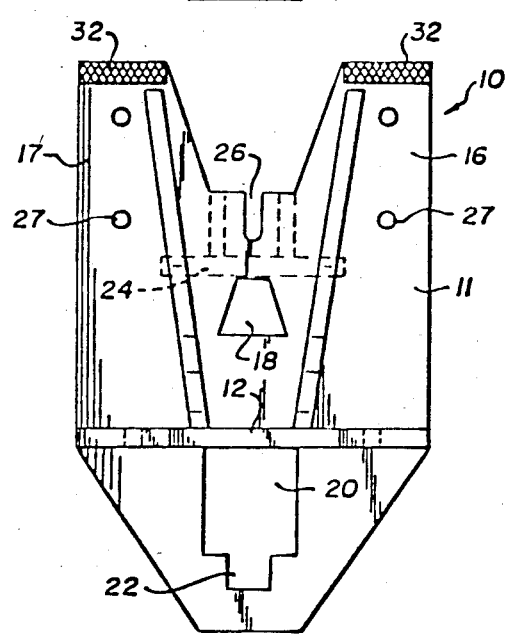
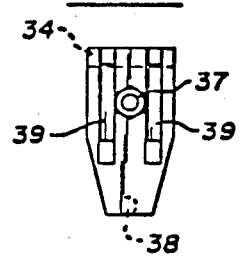
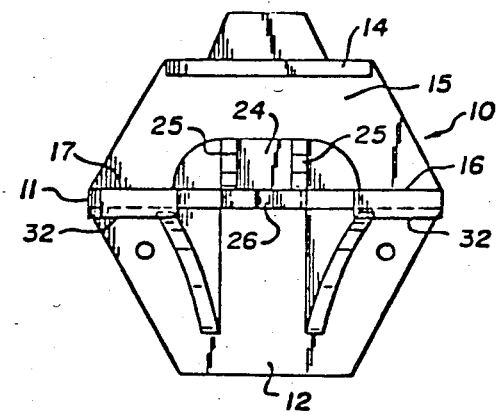

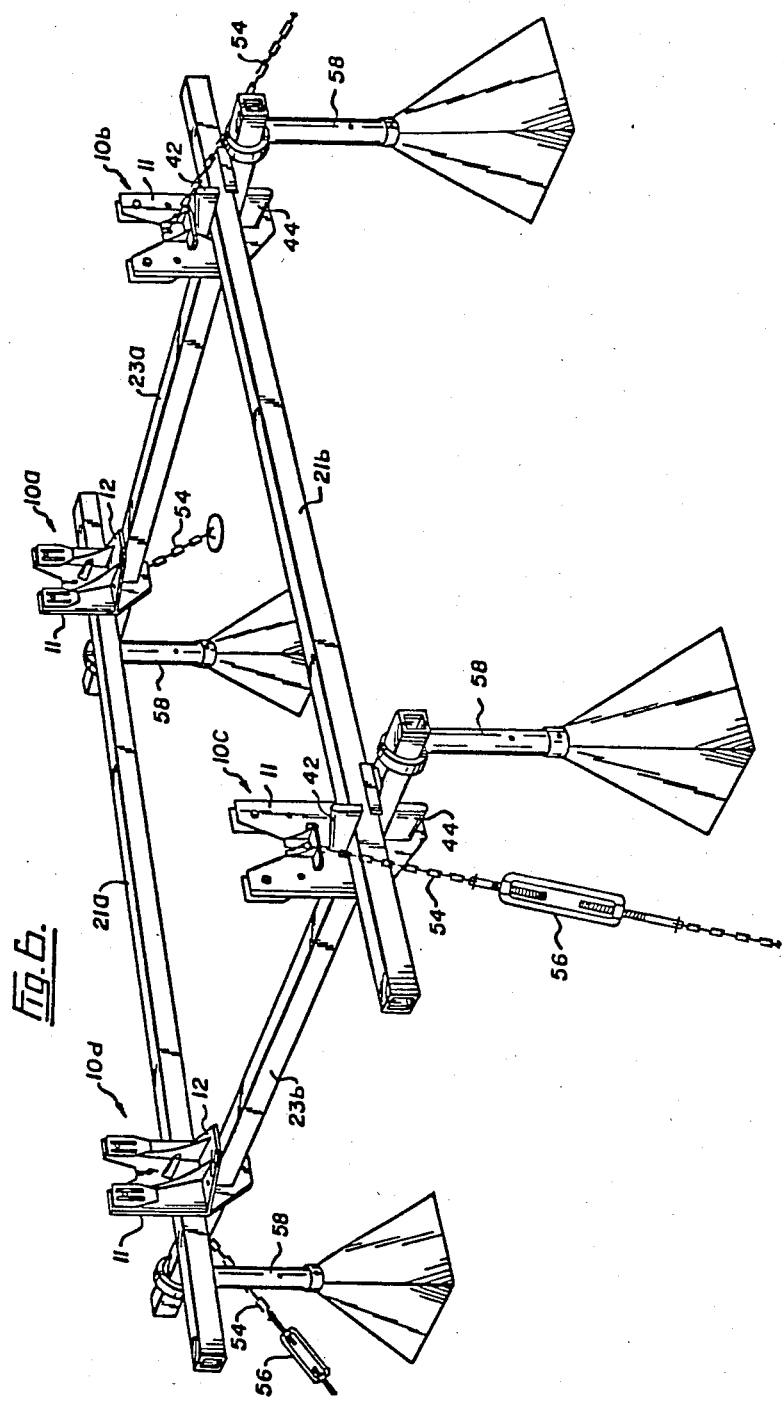

VEHICLE CLAMPING AND SUPPORT APPARATUS

CROSS-REFERENCE TO RELATED APPLICATION

This application is a continuation-in-part of U.S. application Ser. No. 543,798 filed Oct. 21, 1983 which was a continuation-in-part of U.S. application Ser. No. 367,197 filed apr. 12, 1982, both now abandoned.

FIELD OF THE INVENTION

This application pertains to apparatus for clamping a vehicle and supporting the clamped vehicle in a fixed position. The apparatus is particularly intended for use in vehicle collision repair shops where it is often necessary to clamp and support a damaged vehicle in a fixed position to facilitate repair work on the vehicle.

BACKGROUND OF THE INVENTION

Vehicle collision repair shops typically utilize some form of apparatus for clamping and supporting damaged vehicles in a fixed position to facilitate collision repair work. Such known apparatus is clamped to the damaged vehicle body at a number of pre-selected locations to support the vehicle body while known pulling equipment is used to force the damaged vehicle body back into its original shape.

Many of the known types of vehicle clamping and support apparatus are large and cumbersome—typically occupying a complete bay in the collision repair shop. Although some "portable" vehicle clamping and support devices exist, they are relatively inconvenient to use because they permit only limited flexibility in selection of the points at which the vehicle body is clamped. This often makes it awkward to use such devices with many types of damaged vehicles. Further, such known devices frequently provide only very limited clearance with respect to the vehicle exhaust system and other obstructions, which complicates affixation of such devices to many types of damaged vehicles.

The present invention provides a simplified vehicle clamping and support apparatus which includes a number of separate clamping devices which may be independently clamped to the vehicle body at largely arbitrary points. Support members which slideably engage the clamping devices are then slid into position and secured to the clamping devices, thereby providing a rigid framework for supporting the vehicle body in the clamped position. Accordingly, the invention facilitates rapid clamping and support of a damaged vehicle.

SUMMARY OF THE INVENTION

In accordance with the invention, there is provided a clamping device, comprising clamping means disposed towards an upper end of the device for clamping to a vehicle body and for supporting the clamped position of the vehicle body in a fixed position; and, securing means disposed towards a lower end of the device for releasably securing first and second transverse support members. The securing means comprises a first thin support plate for supporting the first transverse support member; and, a second thin support plate affixed perpendicular to the first support plate. The second support plate has an aperture for slidably receiving and supporting the second transverse support member. The clamping device is separable from the support members, thereby facilitating clamping of the device to a vehicle body before the support members are engaged with and secured by the device. The securing means releasably secures the first and second transverse support members at an adjustable point of cross-over of those members. Advantageously, the securing means slideably engages the first and second transverse support members.

The clamping device securing means preferably includes a first wedge for wedging the first support member against the device, and a second wedge for wedging the second support member against the device. Advantageously, the first wedge may include a rounded edge for permitting limited rotation of the first wedge while it is wedging the first support member against the device. thereby further wedging the first support member against the device.

The clamping device clamping means may comprise first and second spaced clamps for clamping to the vehicle body. A connecting means for connecting the device to a fixed support is included in the clamping means. Preferably, the connecting means comprises a notch for releasably slideably securing a chain. The notch is located on a vertical axis of the device, midway between the first and second clamps.

The invention also provides vehicle clamping and support apparatus comprising first and second support members for positioning, respectively, along first and second lateral undersides of the vehicle; third and fourth support members for positioning, respectively, along the front and rear undersides of the vehicle, transverse to the first and second support members; and first, second, third and fourth clamping devices for, respectively, releasably transversely securing the first and third, second and third, second and fourth, and first and fourth support members and for clamping to the vehicle body to support the clamped position of the vehicle body in a fixed position above the support members.

BRIEF DESCRIPTION OF THE DRAWINGS

FIG. 2 is a side elevation view of the clamping of FIG. 1.

FIG. 3 is a rear elevation view of a portion of the clamping device of FIG. 1 and 2.

FIG. 4 is a rear elevation view of one of the clamp jaws of the clamping device of FIGS. 1 and 2.

FIG. 5 is a top view of the clamping device portion of FIG. 3.

FIG. 6 is a pictorial illustration of a vehicle clamping and support apparatus which includes four clamping devices of the type shown in FIG. 1 and four support members.

DETAILED DESCRIPTION OF A PREFERRED EMBODIMENT OF THE INVENTION

Figure 1:
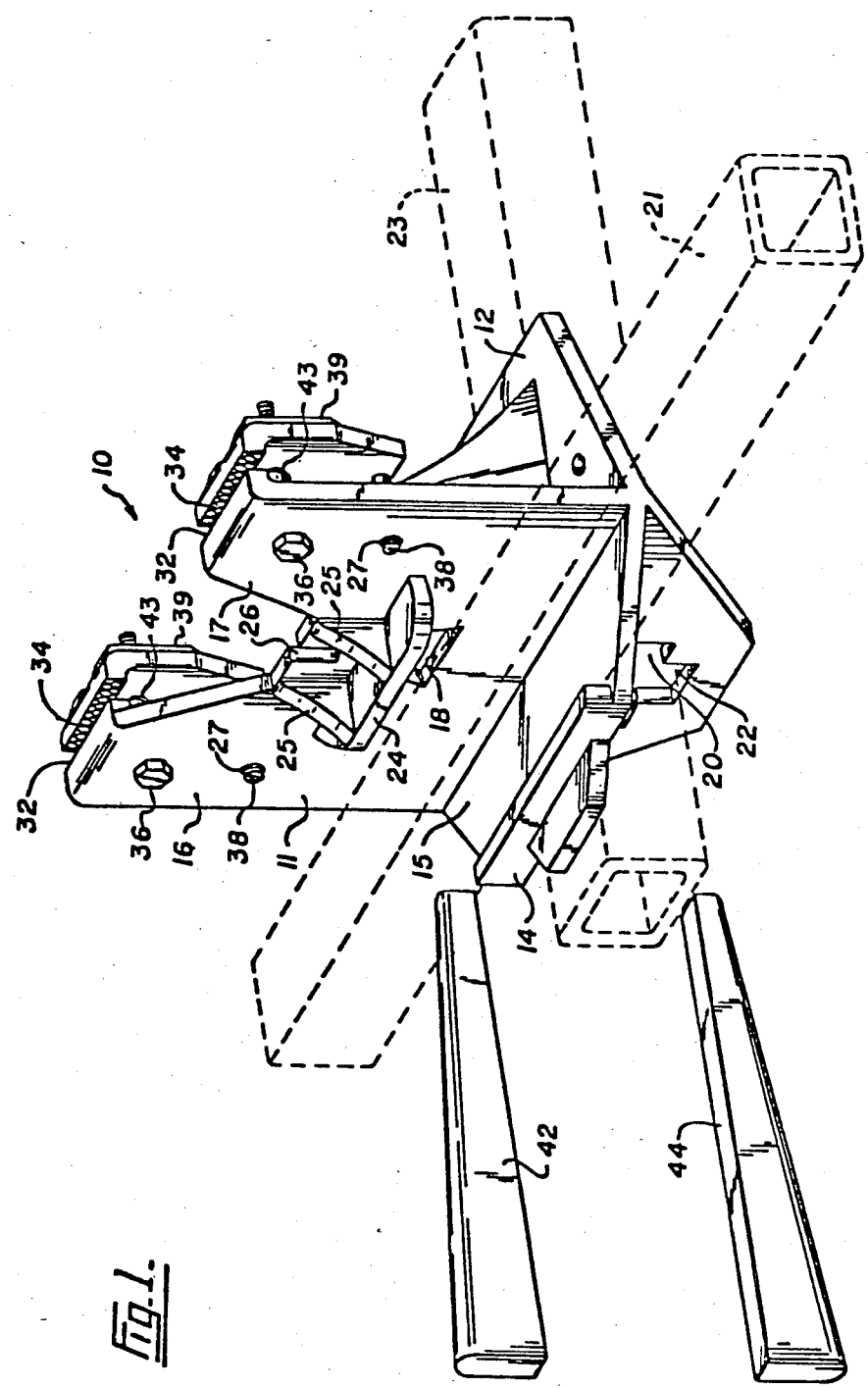
FIG. 1 is a pictorial illustration of a clamping device according to the preferred embodiment.

FIG. 1 illustrates a clamping device 10 of heavy steel plate or other high strength material construction which includes a "clamping means" disposed towards the upper end of device 10 for clamping to a vehicle body. Clamping device 10 also includes a "securing means" disposed toward the lower end of device 10 for releasably securing first and second transverse supportsd members 21, 23 (phantom lines are used in FIG.

1 to illustrate support members 21, 23 to avoid obscuring details of the clamping device 10).

In the preferred emodiment, the "clamping means" of clamping device 10 comprises first and second clamps 16, 17 which are spaced apart from one another. Each of clamps 16, 17 includes a pair of jaws 32, 34 having serrated teeth. Compression springs 43 urge jaw pairs 32, 34 apart. Bolts 36 pass through jaws 32, springs 43 and jaws 34 and threadably engage nuts 37 (held between flanges 39 as shown in FIG. 4) thereby limiting the opening of jaw pairs 32, 34. Threaded studs 38 are affixed, respectively, at one end, to the lower ends of jaws 34. The opposite ends of studs 38 protrude through apertures 27 in body plate 11. Studs 38 are not threaded into apertures 27 but simply slide with respect thereto. Nuts 29 are threaded onto studs 38 and positioned between jaws 32, 34. Rotation of nuts 29 on studs 38 to advance nuts 29 toward body plate 11 causes jaws 34 to pivot about nuts 37 and toward jaws 32.

Clamping device 10 is easily clamped to a vehicle body by positioning clamps 16, 17 over the vehicle underbody pinch welds, with jaws 32 toward the outside of the vehicle and jaws 34 toward the inside of the vehicle. A wrench is then used to tighten nuts 29 against body plate 11, thereby securely clamping the vehicle underbody pinch welds in clamps 16, 17.

The "securing means" of clamping device 10 preferably comprises body plate 11, support plate 15 which is rigidly affixed to body plate 11 at right angles thereto, and flange 14 which is rigidly affixed to support plate 15 at right angles thereto. Body plate 11, flange 14 and support plate 15 define a generally "U" shaped trough for slideably engaging and supporting first support member 21 as shown in FIG. 1. The "securing means" also comprises an aperture 20 formed in body plate 11 beneath support plate 15. The cross sectional area of aperture 20 is made slightly larger than the cross sectional area of second support member 23 so that support member 23 will easily slide through aperture 20.

The "securing means" of clamping device 10 also preferably includes first and second wedges 42, 44. Once first support member 21 has been slideably positioned on clamping device 10, first wedge 42 is driven into first wedge aperture 18, thereby firmly wedging support member 21 against support plate 15. Plate 24, which is reinforced by flanges 25, provides a bracing surface against which wedge 42 acts to wedge first support member 21 against support plate 15. As shown in FIG. 1, the upper surface of first wedge 42 is rounded. This is because support member 21 may tend to slip along its longitudinal axis when forces typically encountered in collision repair work are applied to the clamped vehicle. When such slippage occurs, the rounded edge of first wedge 42 permits limited rotation of wedge 42, such that the squared corners of the lower, nonrounded surface of wedge 42 tend to "bite" into the top surface of support member 21, thereby further wedging support member 21 against support plate 15 and resisting slippage of support member 21.

Second wedge 44 is driven into second wedge aperture 22 after second support member 23 has been slideably positioned in aperture 20. Second wedge 44 wedges second support member 23 against the bottom of support plates 12 and 15. Although the drawings show second wedge 44 as having a rounded surface similar to that of first wedge 42, it has been found that second support member 23 is not as likely to slip during collision repair work as is first support member 21, and so inclusion of the rounded surface on second wedge 44 is optional.

As FIG. 1 shows, clamping device 10 releasably secures first and second support members 21, 23 in transverse relationship. Clamping device 10 defines the point of cross over of members 21, 23 and readily facilitates adjustment of that point of cross over by sliding either of members 21 or 23 with respect to clamping device 10. Preferably, clamping device 10 is constructed such that the point of cross-over of members 21, 23 is maintained at least six inches below the point at which jaw pairs 32, 34 clampingly engage the vehicle body. This is to ensure adequate clearance between support members 21, 23 and obstructions such as the vehicle underbody, exhaust system etc. and also to provide clearance for measuring apparatus which, in some cases, may be inserted between support members 21, 23 and the vehicle underbody to obtain measurements for guiding collision repair work on the vehicle.

Clamping device 10 also preferably includes a "connecting means" such as notch 26 which is sized to releasably, slideably secure one link of a chain, thus facilitating attachment of an end of the chain to clamping device 10. The opposite end of the chain may be affixed, in known fashion, to a pulling device or to a fixed support. As may be seen in FIG. 3, notch 26 is located on a central vertical axis of clamping device 10, midway between clamps 16 and 17.

In operation, a collision repairman selects four separate clamping devices like that shown at 10 in FIG. 1. and roughly adjusts the spacing between jaw pairs 32, 34 of each clamping device with the aid of nuts 29, bolts 36 and nuts 37. The four clamping devices are then securely clamped over the vehicle underbody pinch welds as described above. One pair of clamping devices is clamped on opposite sides of the vehicle underbody, towards the rear of the vehicle. The second pair of clamping devices is clamped on opposite sides of the vehicle underbody, towards the front of the vehicle.

The rear pair of clamping devices need only be positioned at approximately equal distances from the front of the vehicle to approximately align apertures 20 of the rear pair of clamping devices so that a support member like that shown at 23 in FIG. 1 may easily slide through apertures 20 of the rear pair of clamping devices. Since plate 11 is relatively thin, the end of support member 23 may be considerably displaced relative to aperture 20 after member 23 is passed through aperture 20, thereby facilitating alignment of the end of support member 23 with the aperture 20 of the opposed clamping device. This offers a significant advantage over prior art arrangements which typically provide sleeve members for slidably receiving and supporting cross members. A cross member held by a sleeve usually cannot be significantly displaced in a direction perpendicular to the longitudinal axis of the cross member. Thus, if a sleeve were used instead of relatively thin plate 11 the collision repairman would have to make tedious measurements and move back and forth between opposite sides of the vehicle to precisely position two clamping devices equipped with sleeves relative to one another so that a cross member could be passed through the sleeves on both clamping devices.

Similarly, the front, or second pair of clamping devices need only be positioned at approximately equal distances from the front of the vehicle to approximately align apertures 20 of the front pair of clamping devices so that another support member, also like that shown at 23 in FIG. 1, may easily slide through apertures 20 of the front pair of clamping devices.

Since four separate clamping devices are used, their positioning on the vehicle underbody is largely arbitrary. Thus, maximum flexibility is provided in the selection of points at which the clamping devices are clamped to the vehicle underbody. This is significant because it may not always be possible to apply clamping devices on opposed sides of a damaged vehicle at points equidistant from the front or rear of the vehicle due to collision damage; a constraint which is characteristic of many prior art vehicle clamping and support arrangements. Offset positioning of the applicant's clamping devices, relative to one another, may thus enable collision repair work to proceed in situations where prior art clamping and support apparatus could not have been used.

FIG. 6 is a pictorial illustration of a vehicle clamping and support apparatus which includes four clamping devices of the type shown in FIG. 1 and four support members. The vehicle has been omitted from FIG. 6 to avoid obscuring details of the vehicle clamping and support apparatus. In FIG. 6 the reference numerals 10a, 10b, 10c and 10d designate, respectively, first, second, third and fourth clamping devices of the type shown and described above with reference to FIG. 1. First and second clamping devices 10a, 10b are clamped on opposite sides of the vehicle underbody, towards the rear of the vehicle as described above. Third and fourth clamping devices 10c, 10d are clamped on opposite sides of the vehicle underbody, towards the front of the vehicle, as described above. First support member 21a is then positioned along one lateral underside of the vehicle by sliding first support member 21a along the "U" shaped troughs formed by body plate 11, flange 14 and support plate 15 in each of first and fourth clamping devices 10a, 10d. Second support member 21b is positioned, in similar fashion, along the other lateral underside of the vehicle by slideably supporting second support member 21b on second and third clamping devices 10b, 10c. Four separate wedges 42 are then driven into wedging apertures 18 of each of clamping devices 10a, 10b, 10c and 10d to secure first and second support members 21a, 21b. Third support member 23a is then positioned along the rear underside of the vehicle, transversely to support members 21a, 21b, by sliding third support member 23a through apertures 20 in each of clamping devices 10a, 10b. Fourth support member 23b is positioned in similar fashion, along the front underside of the vehicle, by sliding fourth support member 23b through apertures 20 in clamping devices 10c, 10d. Four separate wedges 44 are then driven into wedging apertures 22 in each of clamping devices 10a, 10b, 10c and 10d to secure third and fourth support members 23a, 23b. The vehicle is thus clamped and secured to a rigid support framework comprising first and second support members 21a, 21b and third and fourth support members 23a, 23b.

Jacks 58 or other convenient means may be used to raise or lower the vehicle on the support framework. Ends of chains 54 may be releasably secured to notches 26 in each of clamping devices 10a, 10b, 10c and 10d. The opposite ends of chains 54 may be secured to convenient supports such as shop floor pots or a frame rack. Turnbuckles 56 may be provided to adjust the tension in each of chains 54.

Once the vehicle is clamped and supported as described above, collision damage to the vehicle may be repaired in conventional fashion to force the damaged vehicle body back into its original shape. When the collision repair work has been completed, the apparatus is easily disassembled by releasing chains 54 from notches 26, knocking out wedges 42, 44 at each clamping device, slideably removing support members 21a, 21b, 23a and 23b and releasing clamps 16, 17 at each clamping device.

Figure 7:
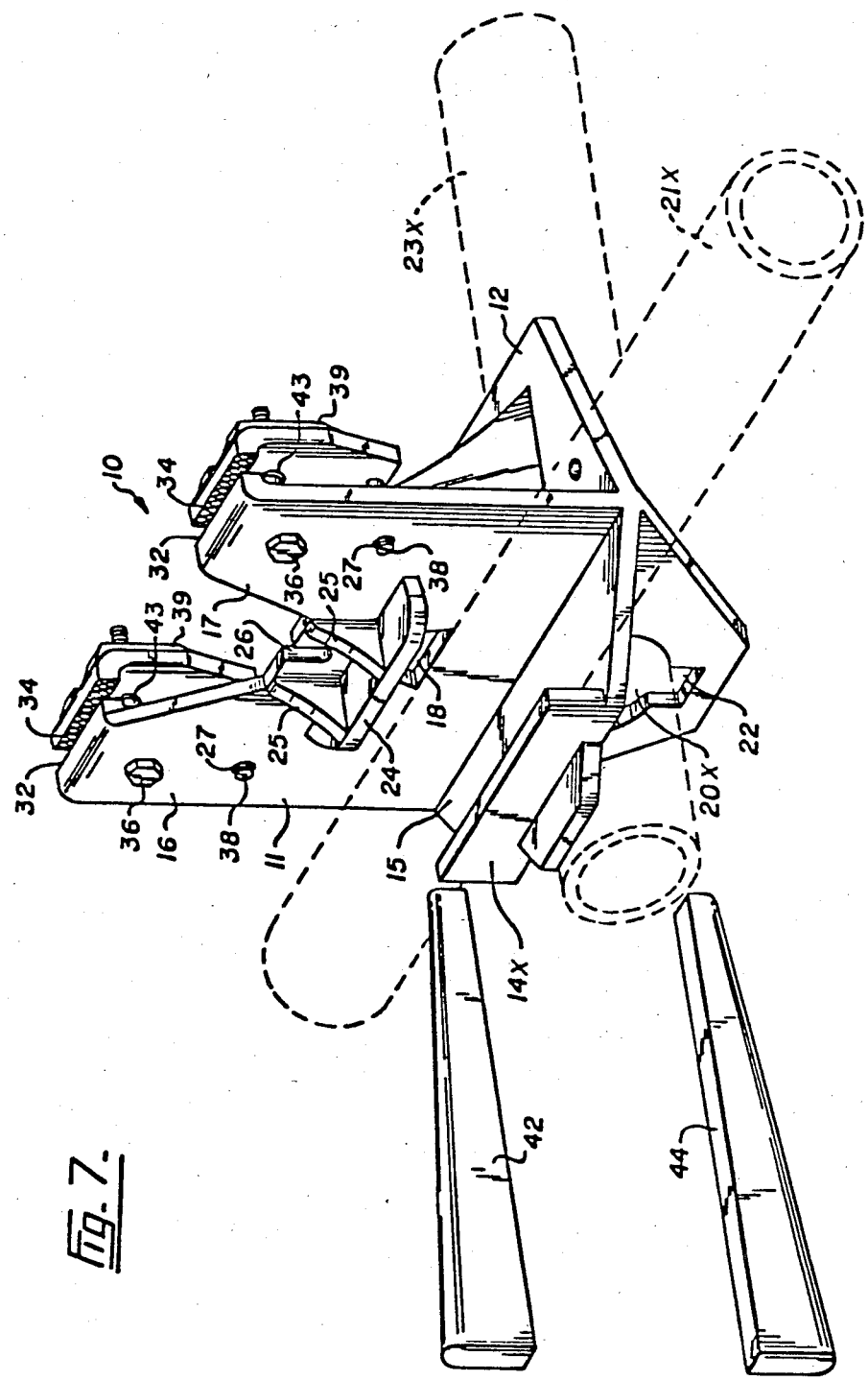
FIG. 7 is a pictorial illustration of a clamping device like that of FIG. 1 which has been modified for use with support members of circular cross section.

Clamping device 10 need only be modified in minor respects to facilitate its use with support members of any desired cross section. FIG. 7 shows, for example, how clamping device 10 may be modified for use with support members 21x, 23x of circular cross section. To facilitate such use, flange 14x should protrude upward from support plate 15 a distance equal to at least the radius of support member 21x. Also, the cross sectional shape and size of aperture 20x should be varied to accommodate the cross sectional shape and size of support member 23x.

Some vehicles have special adaptors for engaging jacks or support apparatus used in collision repair work. For example, Mercedes Benz automobiles have four reinforced sockets along the front and rear lateral undersides of the vehicle, one pair of such sockets on each side of the vehicle. These sockets are sized to slideably receive a pin. The jack provided with Mercedes Benz automobiles has a pin which must be slid into one of the four sockets to provide a point of leverage against which the vehicle may be raised with the aid of the jack. Clamping device 10 can be used with specialized supports of this type For example, a pin sized for slideable insertion within the sockets of the particular vehicle under repair can be welded to a short piece of angle iron. The angle iron is then clamped securely to clamps 16, 17 and the pin inserted into the socket on the vehicle. Repair work then proceeds as previously described in respect of vehicles to which clamping devie 10 is directly clamped.

As will be apparent to those skilled in the art, in the light of the foregoing disclosure, many alterations and modifications are possible in the practice of this invention without departing from the spirit or scope thereof. Accordingly, the scope of the invention is to be construed in accordance with the substance defined by the following claims.

I claim:

1. A clamping device, comprising:
   (a) clamping means disposed towards an upper end of the device for clamping to a vehicle body and for supporting the clamped position of the vehicle body in a fixed position; and,
   (b) securing means disposed towards a lower end of the device for releasably securing first and second transverse support members; said securing means comprising:
      (i) a first thin support plate for supporting said first transverse support member; and
      (ii) a second thin support plate affixed perpendicular to said first support plate, said second support plate having an aperture for slidably receiving and supporting said second transveres support member;
   the device being separable from said support members, whereby the device may be clamped to the vehicle body before said support members are engaged with and secured by the device.

2. A clamping device as defined in claim 1, wherein said securing means releasably secures said first and second transverse support members at an adjustable point of cross-over of said members.

3. A clamping device as defined in claim 2, wherein said securing means slideably engages said first and second transverse support members.

4. A clamping device as defined in claim 3, wherein said securing means includes a first wedge for wedging said first support member against the device, and a second wedge for wedging said second support member against the device.

5. A clamping device as defined in claim 4, wherein said first wedge includes a rounded edge for permitting limited rotation of said first wedge while said first wedge is wedging said first support member against the device, thereby further wedging said first support member against the device.

6. A clamping device as defined in claim 1, wherein said clamping means comprises first and second spaced clamps for clamping to the vehicle body.

7. A clamping device as defined in claim 6, further comprising connecting means for connecting the device to a fixed support.

8. A clamping device as defined in claim 7, wherein said connecting means comprises a notch for releasably slideably securing a chain.

9. A clamping device as defined in claim 8, wherein said notch is located on a vertical axis of the device, midway between said first and second clamps.

10. Vehicle clamping and support apparatus, comprising:
(a) first and second support members for positioning, respectively, along first and second lateral undersides of the vehicle;
(b) third and fourth support members for positioning, respectively, along front and rear undersides of the vehicle, transverse to said first and second support members;
(c) a first clamping device, comprising:
(i) securing means disposed towards a lower end of the device for releasably transversely securing said first and third support members;
(ii) clamping means disposed towards an upper end of the device for clamping to the vehicle body and for supporting the clamped position of the vehicle body in a fixed position above said first and third support members;
(d) a second clamping device, comprising:
(i) securing means disposed towards a lower end of the device for releasably transversely securing said second and third support members;
(ii) clamping means disposed towards an upper end of the device for clamping to the vehicle body and for supporting the clamped position of the vehicle body in a fixed position above said second and third support members;
(e) a third clamping device, comprising:
(i) securing means disposed towards a lower end of the device for releasably transversely securing said second and fourth support members;
(ii) clampng means disposed towards an upper end of the device for clamping to the vehicle body and for supporting the clamped position of the vehicle body in a fixed position above said second and fourth support members; and,
(f) a fourth clamping device, comprising:
(i) securing means disposed towards a lower end of the device for releasably transversely securing said first and fourth support members;
(ii) clamping means disposed towards an upper end of the device for clamping to the vehicle body and for supporting the clamped position of the vehicle body in a fixed position above said first and fourth support members;
said securing means each comprising:
(i) a first thin support plate for supporting said first or second support member; and,
(ii) a second thin plate affixed perpendicular to said first support plate, said second support plate having an aperture for slidably receiving and supporting said third or fourth support member;
the clamping devices being separable from said support members, whereby the clamping devices may be clamped to the vehicle body before said support members are engaged with and secured by the clamping devices.

11. Vehicle clamping and support apparatus as defined in claim 10, wherein:
(a) first clamping device releasably secures said first and third support members at an adjustable point of cross-over of said first and third members;
(b) said second clamping device releasably secures said second and third support members at an adjustable point of cross-over of said second and third members;
(c) said third clamping device releasably secures said second and fourth support members at an adjustable point of cross-over of said second and fourth members; and,
(d) said fourth clamping device releasably secures said first and fourth support members at an adjustable point of cross-over of said first and fourth members.

12. Vehicle clamping and support apparatus as defined in claim 11, wherein:
(a) said first clamping device slideably engages said first and third support members;
(b) said second clamping device slideably engages said second and third support members;
(c) said third clamping device slideably engages said second and fourth support members; and,
(d) said fourth clamping device slideably engages said first and fourth support members.

13. Vehicle clamping and support apparatus as defined in claim 10, wherein said first, second, third and fourth clamping device clamping means each comprise first and second spaced clamps for clamping to a flange of the vehicle body.

14. Vehicle clamping and support apparatus as defined in claim 13, wherein said first, second, third and fourth clamping devices each further comprise a connecting means for connecting each of said clamping devices to a fixed support.

15. Vehicle clamping and support apparatus as defined in claim 14, wherein each of said connecting means comprises a notch for releasably slideably securing a chain.

16. Vehicle clamping and support apparatus as defined in claim 15, wherein each of said notches is located on a vertical axis of said respective clamping devices, midway between said first and second clamps.

17. A clamping device as defined in claim 3, wherein said point of cross-over is maintained at least six inches below the point at which the device clampingly engages the vehicle body.

18. A vehicle clamping device for use with first and second elongate, transversely extending support members, comprising:
- a body including first and second ends and jaws for clamping to the vehicle;
- the body defining a generally U-shaped trough for receipt of the first support member, the trough defined by a base, a first side and a second side;
- means for locking the first support member within the trough;
- the body including a thin plate having an opening positioned and sized for receipt of the second elongate member, the thin plate and opening sized to permit the second support member to be oriented relative to the thin plate over a range of angular orientations; and
- means for locking the second support member within the opening.

19. The device of claim 18 wherein the jaws includes first and second spaced apart pairs of jaws and wherein the body includes a fastening point between the pairs of jaws so that straightening forces are transferred directly to the jaws.

20. The device of claim 19 wherein the fastening point is a notch generally equidistant from the pairs of jaws but offset from a line connecting the pairs of jaws.

21. The device of claim 18 wherein the first and second sides extend generally vertically from the base and the first side is higher than the second side.

22. The device of claim 18 wherein the first side is coplanar with the thin plate.

23. The device of claim 18 wherein:
- the body includes a first wedging surface overlying the base; and
- the first support member locking means includes a first wedge and a first aperture formed in the first side sized for receipt of the first wedge, the first wedge being jammed between the first support member and the first wedging surface of the body.

24. The device of claim 23 wherein the body includes a bracing plate extending from the first side above the first aperture, the bracing plate including the first wedging surface against which the first wedge presses.

25. The device of claim 23 wherein the first wedge has first and second tapered edges, the first tapered edge being rounded.

26. The device of claim 18 wherein:
- the body includes a second wedging surface; and
- the second support member locking means includes a second wedge and a second aperture in the thin plate contiguous with the opening and sized for receipt of the second wedge so insertion of the second wedge into the second aperture forces the second support member against the second wedging surface.

27. The device of claim 26 wherein the base of the trough has a first surface against which the first support member rests and a second surface, opposite the first surface, the second surface being the second wedging surface.

28. A vehicle clamping device for use with first and second elongate, transversely extending support members, comprising:
- a body including first and second ends and jaws for clamping to the vehicle;
- the body defining a generally U-shaped trough for receipt of the first support member, the trough defined by a base, a first side and a second side;
- the body including a first wedging surface overlying the base;
- a first support member locking means including a first wedge and a first aperture formed in the first side sized for receipt of the first wedge, the first wedge being jammed between the first support member and the first wedging surface of the body;
- the body including a thin plate having an opening positioned and sized for receipt of the second elongate member, the thin plate and opening sized to permit the second support member to be oriented relative to the thin plate over a range of angular orientations; and
- the body including a second wedging surface; and
- a second support member locking means including a second wedge and a second aperture in the thin plate contiguous with the opening and sized for receipt of the second wedge so insertion of the second wedge into the second aperture forces the second support member against the second wedging surface.

29. The device of claim 28 wherein:
- the jaws includes first and second spaced apart pairs of jaws and wherein the body includes a fastening point positioned equidistant between the pairs of jaws so that straightening forces are transferred directly to the jaws;
- the first wedge has first and second tapered edges, the first tapered edge being rounded; and
- the base of the trough has a first surface against which the first support member rests and a second surface, opposite the first surface, the second surface being the second wedging surface.

* * * * *